M. KOHN.
DEVICE FOR REMOVING CORN FROM THE COB.
APPLICATION FILED NOV. 14, 1910.
1,035,606.
Patented Aug. 13, 1912.
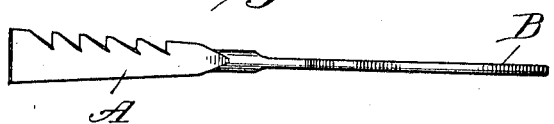
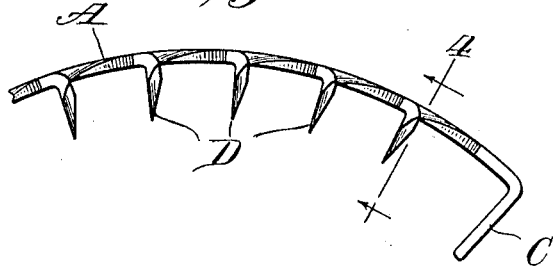
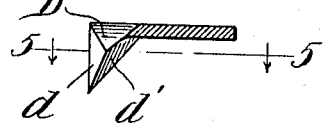
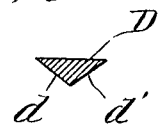
Witnesses:
Harry S. Gaither
Ruby V. Brydges.
Inventor:
Monroe Kohn
by Chamberlin & Freudenreich
attys

UNITED STATES PATENT OFFICE.

MONROE KOHN, OF CHICAGO, ILLINOIS.

DEVICE FOR REMOVING CORN FROM THE COB.

1,035,606.  Specification of Letters Patent.  Patented Aug. 13, 1912.

Application filed November 14, 1910. Serial No. 592,186.

*To all whom it may concern:*

Be it known that I, MONROE KOHN, a citizen of the United States, residing at Chicago, county of Cook, State of Illinois, have invented a certain new and useful Improvement in Devices for Removing Corn from the Cob, and declare the following to be a full, clear, and exact description of the same, such as will enable others skilled in the art to which it pertains to make and use the same, reference being had to the accompanying drawings, which form a part of this specification.

My invention has for its object to produce a cheap, simple and efficient device for slitting green corn on the cob and then removing it from the cob.

The various features of novelty whereby my invention is characterized will hereinafter be pointed out with particularity in the claims; but for a full understanding of my invention and of its object and advantages, reference may be had to the following detailed description taken in connection with the accompanying drawing, wherein:

Figure 1 is a side view of my improved device shown in operative relation to an ear of corn which is indicated in dotted lines; Fig. 2 is a top plan view; Fig. 3 is a view on an enlarged scale looking in the opposite direction from Fig. 1 and showing only the blade; Fig. 4 is a section on line 4—4 of Fig. 3; and Fig. 5 is a section on line 5—5 of Fig. 1.

Referring to the drawing, A represents a long flat curved blade having a handle B. I prefer to make the blade and the handle from a single piece of metal, although in some aspects of my invention this is not essential; the entire device being made of a piece of wire which is bent into the form of a loop to constitute a handle, leaving a stem-like portion projecting at one end of the handle. The stem may then be flattened, so as to produce a blade which lies at right angles to the plane of the handle. The blade is preferably curved somewhat so that when it is laid flat across an ear of corn it will engage therewith throughout the length of the blade. The free end of the blade is bent down, as at C, so as to form a guide which may enter the space between two longitudinal rows of grains and direct the movement of the device when it is moved along the ear. Along one of the long edges of the blade I form a series of downwardly extending teeth D which are spaced apart so as to correspond to the circumferential spacing of the grains on an average ear of corn. I prefer to form these teeth by partially shearing portions of the blade from the main body thereof and then bending these portions down and sharpening them. This may best be accomplished by cutting a series of parallel diagonal slits in the blade along one of its long edges and then bending the sheared portions down along transverse lines. In this way the teeth are given the shape of a triangle having its base in the plane of the blade and its apex at the lowermost point of the tooth. Furthermore each tooth lies in a plane extending transversely of the blade, so that each tooth presents its narrowest dimension as it is moved along the ear. The teeth are preferably sharpened by beveling them in opposite direction as indicated at $d$ and $d'$.

In using the device, the blade is laid across an ear of corn with the member C lying between two adjacent rows. The device is then pressed down upon the ear so as to sink the teeth into the underlying grains. When the device is moved along the ear, being guided by the member C, the grains of the several rows over which the teeth pass are slit. The blade is then turned over so as to bring its back edge upon the ear and, upon moving the device over the same path as before, the slit grains are cleanly scraped from the cob. Another series of rows of grains may then be slit and finally scraped from the cob, this process being repeated until the cob has been stripped.

It will be seen that a device made in accordance with my invention may be small and neat in appearance and at the same time be a powerful instrument for the purpose intended. By making the handle flat and in a plane at right angles to the plane of the blade, an effective grip may be obtained which will make it difficult for the blade to turn. Furthermore, by drawing the blade in such a direction that the back edge is in advance, the main body of the blade acts as a supporting device to prevent tilting.

While I have illustrated and described with particularity only a single form of my invention I do not desire to be limited to the specific details so illustrated and described; but intend covering all constructions and arrangements which fall within the terms employed in the definitions of my invention constituting the appended claims.

What I claim is:

1. In a device of the character described, a single piece of wire bent at one end into a loop so as to form a handle and a stem projecting therefrom, said stem being flattened so as to form a thin blade lying in a plane at right angles to the plane of the loop, portions of the blade at one of its long edges being partially severed and bent laterally to form a series of teeth each of which extends transversely of the blade, said blade being curved as a whole so as to bring the teeth on the concave side.

2. In a device of the character described, a single piece of wire bent at one end into a loop so as to form a handle and a stem projecting therefrom, said stem being flattened so as to form a thin blade lying in a plane at right angles to the plane of the loop, portions of the blade at one of its long edges being partially severed and bent laterally to form a series of teeth each of which extends transversely of the blade, said blade being curved as a whole so as to bring the teeth on the concave side, and the extreme end of the blade being bent laterally in the same direction as the teeth to form a guide.

3. In a device of the character described, a thin flat blade curved about an axis parallel with the plane of the blade, portions of the blade at one of its long edges being partially severed and bent laterally to form a series of teeth each of which extends transversely of the blade from its concave side, and a handle attached to one end of the blade.

4. In a device of the character described, a thin flat blade curved about an axis parallel with the plane of the blade, portions of the blade at one of its long edges being partially severed and bent laterally to form a series of teeth each of which extends transversely of the blade from its concave side, and a wide flat handle attached to one end of the blade and lying in a plane at right angles to the plane of the blade.

In testimony whereof, I sign this specification in the presence of two witnesses.

MONROE KOHN.

Witnesses:
WM. F. FREUDENREICH,
H. S. GAITHER.

---

Copies of this patent may be obtained for five cents each, by addressing the "Commissioner of Patents, Washington, D. C."